United States Patent [19]

Kinghorn

[11] Patent Number: 5,442,698
[45] Date of Patent: Aug. 15, 1995

[54] RINGING GENERATOR FOR TELEPHONES

[75] Inventor: William Kinghorn, Minneapolis, Minn.

[73] Assignee: ADC Telecommunications, Inc., Minneapolis, Minn.

[21] Appl. No.: 719,161

[22] Filed: Jun. 21, 1991

[51] Int. Cl.$^6$ .............................................. H04M 3/02
[52] U.S. Cl. .................................. 379/418; 379/372; 379/252; 379/253; 363/65
[58] Field of Search ............... 379/372, 373, 418, 252, 379/253, 254, 255; 328/16, 23; 307/521; 363/65

[56] References Cited

U.S. PATENT DOCUMENTS

| | | |
|---|---|---|
| 3,500,213 | 3/1970 | Ameau . |
| 3,544,906 | 12/1970 | Dulaney et al. . |
| 3,551,826 | 12/1970 | Sepe . |
| 3,657,657 | 8/1972 | Jefferson . |
| 3,838,414 | 9/1994 | Wiles . |
| 4,239,941 | 12/1980 | Gauthier et al. ............... 379/418 |
| 4,584,576 | 4/1986 | Forestier et al. ............ 379/418 X |
| 4,665,372 | 5/1987 | Schwartz . |
| 4,692,713 | 9/1987 | Cordwell et al. . |
| 4,916,599 | 4/1990 | Traxler et al. ...................... 363/65 |
| 4,924,511 | 5/1990 | Burns et al. ...................... 379/418 |
| 4,926,130 | 5/1990 | Weaver . |
| 5,001,748 | 3/1991 | Burns et al. ...................... 379/418 |

FOREIGN PATENT DOCUMENTS 0041068  3/1982  Japan .................................. 379/418

Primary Examiner—James L. Dwyer
Assistant Examiner—M. Shehata
Attorney, Agent, or Firm—Schwegman, Lundberg & Woessner

[57] ABSTRACT

A ringing generator includes a binary signal source generating a waveform with eight degrees of freedom controlled to suppress or cancel certain harmonics to produce a binary low frequency signal substantially free of low frequency components other than the desired ringing frequency. The binary signal is amplified and filtered to remove unwanted frequency components above a certain threshold to produce a substantially sinusoidal ringing signal.

23 Claims, 6 Drawing Sheets

FIG. 4a $$v(t) = \sum_m a_m \cos m \frac{2\pi}{T} t$$

$$\int_{-\frac{T}{2}}^{\frac{T}{2}} v(t) \cos n \frac{2\pi}{T} t \, dt = \int_{-\frac{T}{2}}^{\frac{T}{2}} a_n \left( \cos n \frac{2\pi}{T} t \right)^2 dt$$

$$= \frac{1}{2} a_n \int_{-\frac{T}{2}}^{\frac{T}{2}} \left( 1 + \cos n \frac{4\pi}{T} t \right) dt$$

$$= \frac{1}{2} a_n T$$

$$a_n = \frac{4}{T} \int_0^{\frac{T}{2}} v(t) \cos n \frac{2\pi}{T} t \, dt$$

$$= \frac{4A}{T} \Bigg[ \int_0^{T_1} \cos n \frac{2\pi}{T} t \, dt \quad - \quad \int_{T_1}^{T_2} \cos n \frac{2\pi}{T} t \, dt$$

$$+ \int_{T_2}^{T_3} \cos n \frac{2\pi}{T} t \, dt \quad - \quad \int_{T_3}^{T_4} \cos n \frac{2\pi}{T} t \, dt$$

$$+ \int_{T_4}^{\frac{T}{4}} \cos n \frac{2\pi}{T} t \, dt \quad - \quad \int_{\frac{T}{4}}^{\frac{T}{2}-T_4} \cos n \frac{2\pi}{T} t \, dt$$

$$+ \int_{\frac{T}{2}-T_4}^{\frac{T}{2}-T_3} \cos n \frac{2\pi}{T} t \, dt \quad - \quad \int_{\frac{T}{2}-T_3}^{\frac{T}{2}-T_2} \cos n \frac{2\pi}{T} t \, dt$$

$$+ \int_{\frac{T}{2}-T_2}^{\frac{T}{2}-T_1} \cos n \frac{2\pi}{T} t \, dt \quad - \quad \int_{\frac{T}{2}-T_1}^{\frac{T}{2}} \cos n \frac{2\pi}{T} t \, dt \Bigg]$$

FIG. 4b $$a_n = \frac{4A}{n\pi}\left[\sin n\frac{\pi}{2} + (1-\cos n\pi)\left(\sin n\pi\frac{2T_1}{T} - \sin n\pi\frac{2T_2}{T} + \sin n\pi\frac{2T_3}{T} - \sin n\pi\frac{2T_4}{T}\right)\right]$$

$$a_1 = \frac{4A}{\pi}\left[1 + 2\left(\sin 2\pi\frac{T_1}{T} - \sin 2\pi\frac{T_2}{T} + \sin 2\pi\frac{T_3}{T} - \sin 2\pi\frac{T_4}{T}\right)\right]$$

$$a_2 = 0$$

$$a_3 = \frac{4A}{3\pi}\left[-1 + 2\left(\sin 6\pi\frac{T_1}{T} - \sin 6\pi\frac{T_2}{T} + \sin 6\pi\frac{T_3}{T} - \sin 6\pi\frac{T_4}{T}\right)\right]$$

$$a_4 = 0$$

$$a_5 = \frac{4A}{5\pi}\left[1 + 2\left(\sin 10\pi\frac{T_1}{T} - \sin 10\pi\frac{T_2}{T} + \sin 10\pi\frac{T_3}{T} - \sin 10\pi\frac{T_4}{T}\right)\right]$$

$$a_6 = 0$$

$$a_7 = \frac{4A}{7\pi}\left[-1 + 2\left(\sin 14\pi\frac{T_1}{T} - \sin 14\pi\frac{T_2}{T} + \sin 14\pi\frac{T_3}{T} - \sin 14\pi\frac{T_4}{T}\right)\right]$$

$$a_8 = 0$$

$$a_9 = \frac{4A}{9\pi}\left[1 + 2\left(\sin 18\pi\frac{T_1}{T} - \sin 18\pi\frac{T_2}{T} + \sin 18\pi\frac{T_3}{T} - \sin 18\pi\frac{T_4}{T}\right)\right]$$

RINGING GENERATOR FOR TELEPHONES

TECHNICAL FIELD OF THE INVENTION

The present invention pertains generally to telephones and more particularly to ringing generator devices.

BACKGROUND OF THE INVENTION

When only a small amount of ringing power is required at a site powering less than about 50 telephones, it is difficult to produce it using a proportionately small, light-weight and energy-efficient module. Transformers and inductors for use at the required low-frequency (20 Hz) are inherently large, heavy and energy-inefficient. The present invention provides a small, energy efficient ringing generator for such applications.

SUMMARY OF THE INVENTION

The present invention permits the generation of "sinusoidal ringing" with near 100% energy efficiency without the use of low-frequency transformers and inductors. A strictly binary signal, having a strong 20 Hz spectrum component but no other low-frequency components, is generated using almost lossless semiconductor switching devices acting on a direct current power source. An "L/C" low-pass filter, essentially dissipationless, is used to recover the 20 Hz component of the binary waveform. The filter remains small and light-weight since it needs only reject frequencies above several hundred Hertz.

BRIEF DESCRIPTION OF THE DRAWING

FIGS. 4a and 4b show the derivation of expressions used to determine the control parameters for the waveform of FIG. 3.

DETAILED DESCRIPTION OF THE INVENTION

Set forth below is an index to the references used herein.

| Reference | Element |
| --- | --- |
| 10 | Ringing generator |
| 12 | 20 Hz source |
| 14 | Transformer |
| 16 | H-bridge |
| 17a–17a' | transistor |
| 17b–17b' | transistor |
| 17c–17c' | transistor |
| 17d–17d' | transistor |
| 18–18' | resistor |
| 20 | L-C filter |
| 30 | Telephone lines |
| 40 | 1.3 MHz Oscillator |
| 42 | 16 Stage Synchronous Binary Counter |
| 44 | XOR chip |
| 46 | PAL chip |
| 47 | PAL chip output |
| 48 | Toggle |
| 49 | CMOS XOR gates |

-continued

| Reference | Element |
| --- | --- |
| $W_1$ | Winding |
| $W_2$ | Winding |
| $W_3$ | Winding |
| L | Inductor |
| C | Capacitor |
| T | Tip conductor |
| R | Ring conductor |
| $S_1$ | Ringing Switch |
| $S_2$ | Ringing Switch |
| $S_N$ | Ringing Switch |

Figure 1:
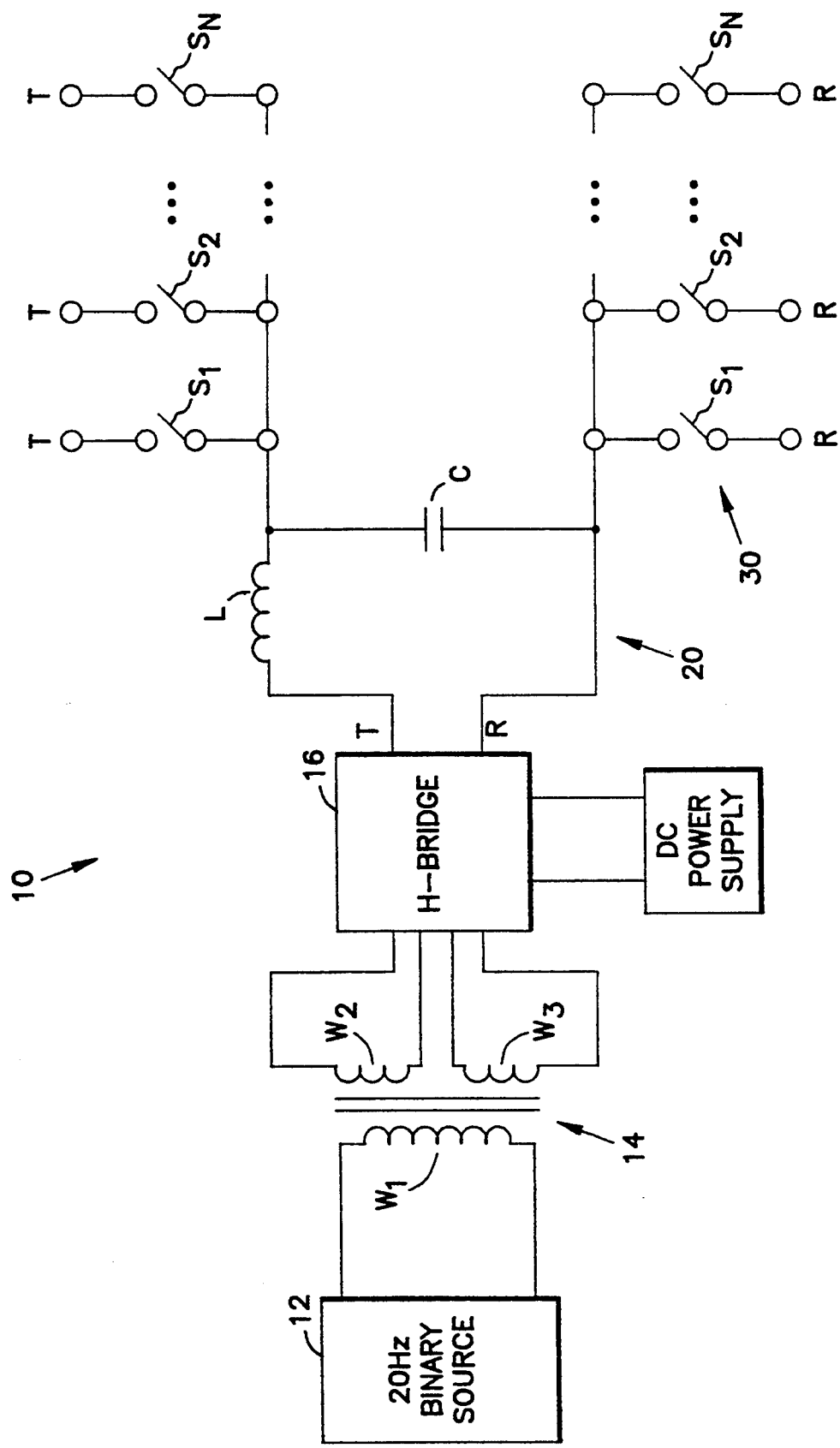
FIG. 1 is a schematic diagram of the ringing generator, in a telephone system according to the present invention.

A simplified diagram of the ringing generator 10 of the present invention, as connected to the tip and ring conductors T and R of a plurality of phone lines 30, is shown in FIG. 1. Ringing generator 10 includes a 20 Hz, binary signal source 12, a transformer 14 having windings $W_1$, $W_2$ and $W_3$, a H-bridge 16, and an L-C filter 20. Generator 10 is connected to tip and ring conductors T and R of a plurality of phone lines 30 through respective switches $S_1$, $S_2$ ... $S_N$. A ringing signal is applied to one of lines 30 by closing its respective switch.

Figure 2:
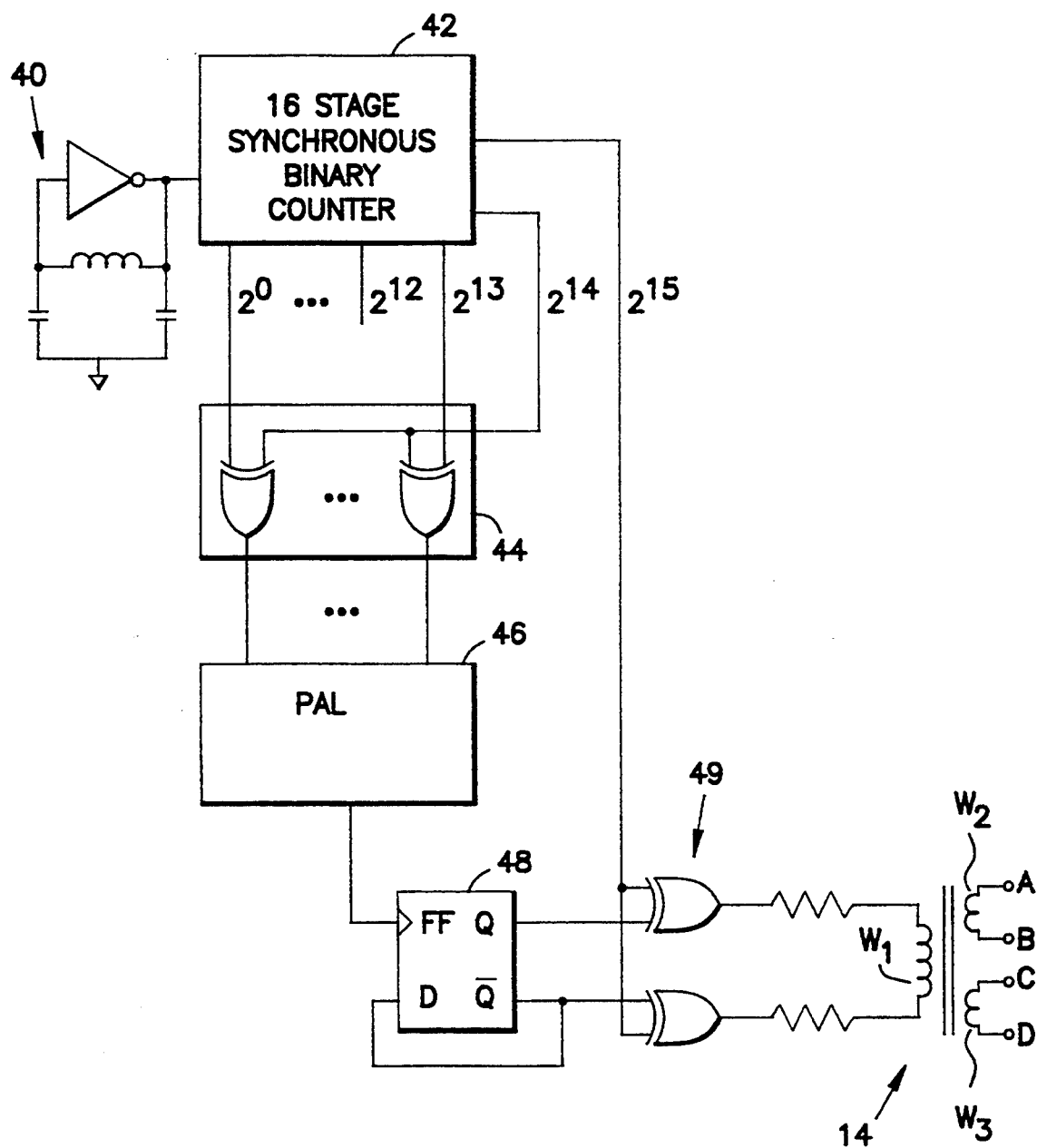
FIG. 2 is a schematic of the 20 Hz source of the ringing generator according to the present invention.

Twenty Hz source 12 is shown in detail in FIG. 2. It includes a 1.3 MHz oscillator 40, a 16-stage synchronous binary counter 42, XOR chip 44 (including a plurality of XOR gates), a PAL chip 46 having an output 47, a toggle 48, CMOS XOR gates 49, and a transformer 14. Source 12 functions to produce a 20 Hz binary waveform with eight degrees of freedom allowing, by programming of the PAL chip 46, suppression of low order harmonics to produce a binary signal substantially free of low frequencies other than the desired 20 Hz signal. After amplification the 20 Hz component is separated from high frequency harmonics to provide an essentially sinusoidal ringing signal. To eliminate the 3rd, 5th, 7th, 9th, 11th, 13th, 15th and 17th harmonics of the 20 Hz signal, the PAL chip 46 is programmed to produce a true output on output 47 for binary inputs:

| | |
| --- | --- |
| $11060_8$ | $11277_8$ |
| $16761_8$ | $17615_8$ |
| $24562_8$ | $26173_8$ |
| $32304_8$ | $34575_8$ |

Figure 3:
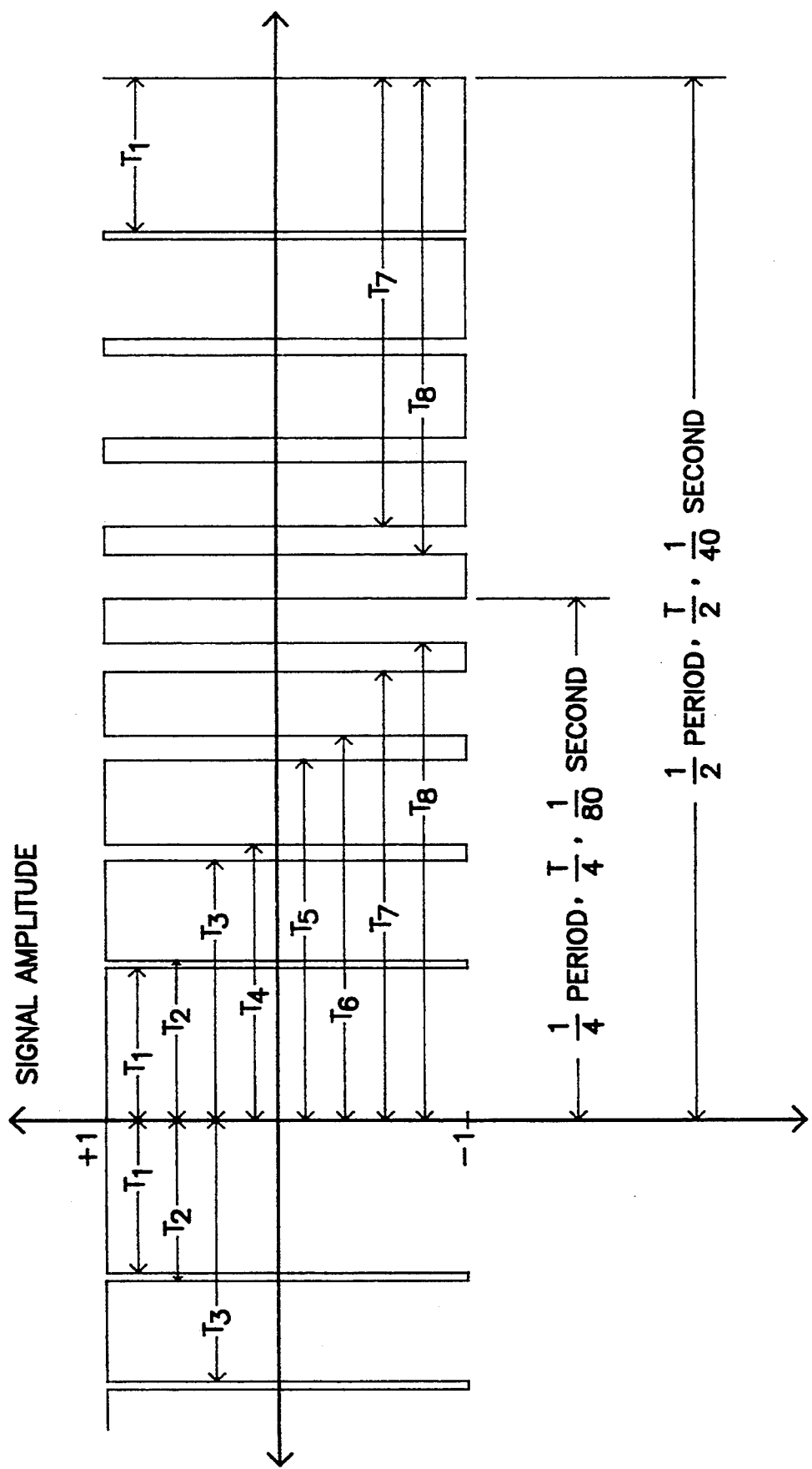
FIG. 3 is a waveform diagram showing a binary waveform with eight degrees of freedom.

The binary signal waveform produced by source 12 has the form shown in FIG. 3, which can be expressed as a Fourier series. The Fourier-series formula is a formula to transform variables between the time domain and the frequency domain, and is thus a "frequency-domain/time-domain transformation formula". An expression for the coefficients of this series is found in terms of the eight time parameters shown in FIG. 3. Though lengthy, the expression can be written directly using the fundamental Fourier formula. All the even order coefficients will be found to be zero because of the symmetry of the waveform. If the general expression is written substituting the particular order numbers 3, 5, 7, 9, 11, 13, 15 and 17, eight expressions result. Each of these contain as variables all eight of the time parameters of FIG. 3, but no other variables if the amplitude of the waveform is arbitrarily assumed to be unity. Solution of the problem requires that non-zero values be found for the eight time parameters which cause the eight coefficients to all be zero. Since the eight expressions are non-linear functions of the eight variables, solution is not trivial. It can, however, be accomplished, for example, by writing a computer program which iteratively, using an ordinary steepest-decent algorithm, minimizes a weighted sum-of-squares of the eight coefficients. The weight values are unimportant except that an initial guess at the eight time variables, which the program requires, does not need to be as good if the lower coefficients are weighted more heavily. Badly chosen initial values cause the sum-of-squares to converge to some local minimum rather than the desired value of zero.

FIGS. 4a, 4b and 4c show the derivation of the expressions used to determine values for the time variables of freedom of the waveform. When applied to FIG. 3, "A" in FIGS. 4a, 4b and 4c is equal to 1 and the number of terms is extended to include 17a in the manner obvious by inspection.

Although the invention is described as implemented using a waveform with eight degrees of freedom, it shall be understood that the invention is in no way limited to such number; waveforms with more or less degrees of freedom can be used.

Source 12 thus produces a strictly binary signal, having a strong 20 Hz spectrum component, but substantially no other low-frequency components. The binary signal has values of approximately 0.2 v and 4.9 v, given a five (5) volt supply to CMOS gates 49, driving transformer 14.

The output of source 12 is applied to winding $W_1$ of transformer 14, which in turn induces current flow in windings $W_2$ and $W_3$. Windings $W_2$ and $W_3$, isolated for direct currents, are connected to H-bridge 16, which amplifies the binary signal and renders it bipolar by removing the direct current (dc) offset, and to L-C filter 20, which removes the high frequency components of the ringing signal, leaving it essential sinusoidal, before application to a telephone line.

Figure 5:
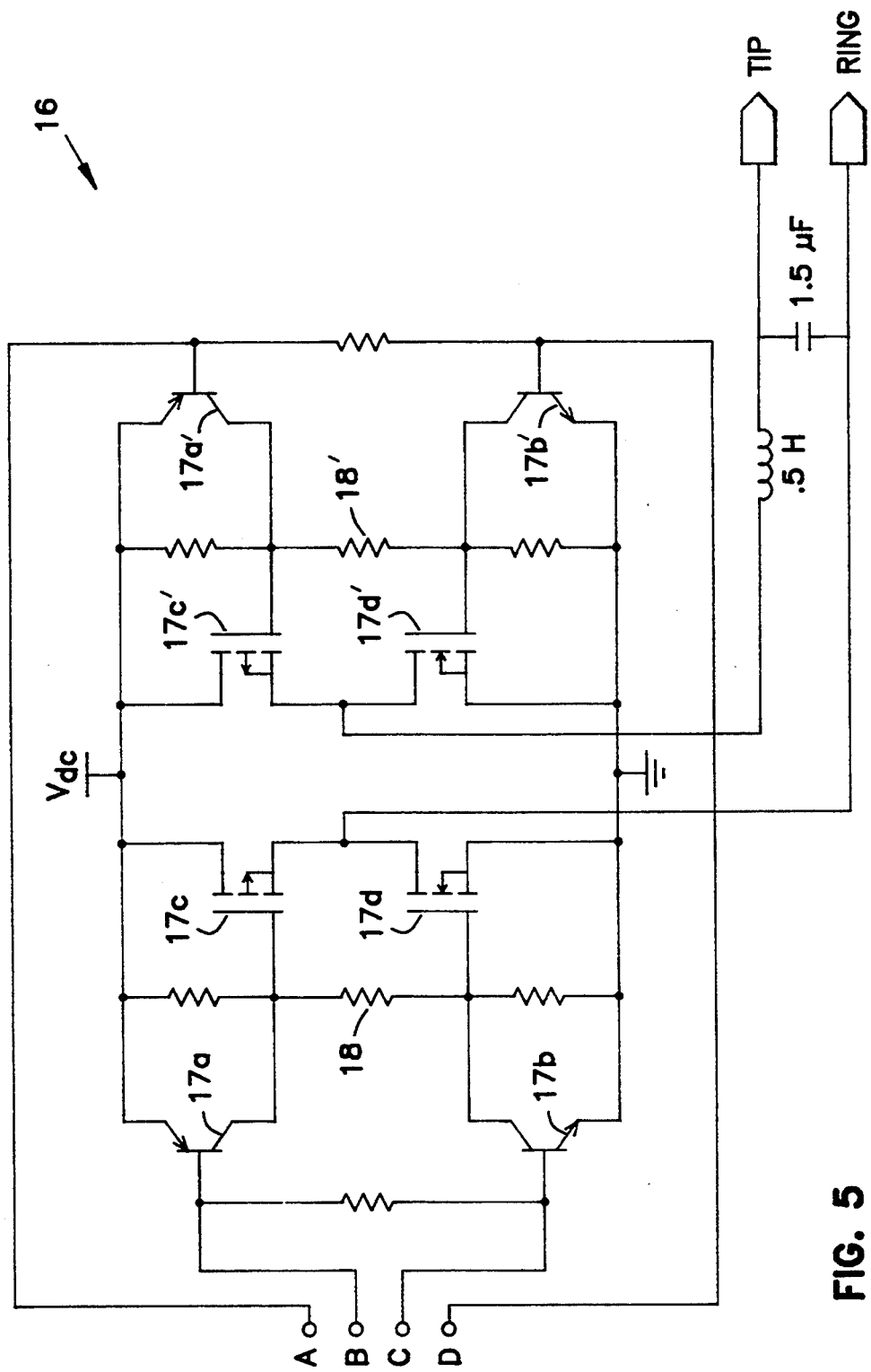
FIG. 5 is a schematic of the H-bridge of the ringing generator according to the present invention.

H-bridge 16 is shown in more detail in FIG. 5. It includes an isolated 130 volt $V_{dc}$ source utilized to cause a direct current through transistors 17a and 17d, or 17c and 17b (or corresponding components 17a', 17b', 17c', 17d') as controlled by the signals of the windings $W_2$ and $W_3$ in response to the binary signal applied to winding $W_1$. The value of resistor 18 (and 18') determines the turn-on time for transistors 17a and 17b (and 17a' and 17b'). Assuming a gate charge of $12 \times 10^{-9}$ Coulombs, a 47K resistance value for resistor 18 will produce a turn-on time of each transistor which exceeds the turn-off time of the other.

H-bridge 16 thus produce a 20 Hz 130 volt peak bipolar signal at the "tip" and "ring" outputs, which is in turn applied to L-C filter 20. Values of 1.5 $\mu$F and 0.75 H for C and L, respectively, produce a second order low-pass filter with a cut-off frequency of 150 Hz, which is sufficient to filter the high-frequency components of concern from the 20 Hz ringing signal before it is applied to lines 30. Values of L and C are chosen to have a particular product which determines the cut-off frequency and to reduce L without permitting excessive circulating currents at the frequencies of the rejected harmonics. Q values for the filter depend on the load (i.e., number of telephones ringing), but response at resonance (cut-off frequency) is unimportant since there is no frequency component near this value in the signal driving the filter. Of course, the filter may be reconfigured for smaller or greater loads, different Q factors, or lower or higher cut-off frequencies.

The ringing generator 10 thus produces a 20 Hz, nearly sinusoidal ringing signal having a peak-to-peak voltage of approximately 260 volts. When applied to the tip and ring conductors of a telephone line 30 through a switch $S_N$, a ringing signal is applied to the line to activate the phone terminating the line.

The invention thus provides a small and efficient ringing generator for telephones. Solid state switching allows for efficiency, while the 20 Hz bipolar signal is free enough of low frequency components so that the L-C filter need only filter higher frequencies and can thus be small.

Thus, the present invention provides a method for generating a ringing signal utilizing the steps of:

(a) generating using a waveform with a plurality of degrees of freedom, a low frequency binary source signal substantially free from all other low frequency components below a certain threshold, by programming the waveform to suppress certain frequency components;

(b) in response to the source signal, generating a high-level, bipolar current of corresponding frequency to the source signal, using a solid state current source; and (c) filtering the high frequency components of the bipolar signal source current to produce the ringing signal.

Although the invention has been described herein in its preferred form, those of skill in the art will readily appreciate that many modifications and changes may be made thereto without departing from the spirit and scope of the claims amended hereto.

I claim:

1. A ringing generator, comprising:
    means for generating a first binary signal which repeats at a desired ringing frequency, one period of said first binary signal comprising:
    a first and second sequence in first and second halves of said period, respectively;
    said first sequence comprising a plurality of first transitions from a first level of said first binary signal to a second level, each of said plurality of first transitions having a certain timing relative to a start of said first half period, and
    said second sequence comprising a plurality of second transitions from said second level of said first binary signal to said first level, each of said plurality of second transitions having a certain timing relative to a start of said second half period, wherein
    said timings of said first transitions and said timings of said second transitions are chosen to substantially cancel selected low-frequency harmonics so that said signal is substantially free of all low frequencies with the exception of the ringing frequency;
    means for sourcing a second binary signal in response to said first binary signal so that said second binary signal has frequency components substantially the same as said first binary signal; and
    filtering means for filtering high-frequency components from said second binary signal to produce a ringing signal for application to a telephone line.

2. A generator according to claim 1 wherein said means for generating said first binary signal uses a digital frequency generator using digital logic for providing control over said binary pulse sequence to suppress low frequencies other than said ringing frequency.

3. A generator according to claim 2, wherein said digital logic causes each said first transition in said first half sequence to occur as a result of a predetermined count being reached in a digital counter driven by said digital frequency generator.

4. A generator according to claim 3, wherein said timings of said first and second transitions are calculated using principles of frequency-domain/time-domain transformation to substantially cancel selected low-frequency harmonics.

5. A generator according to claim 4, wherein said frequency-domain/time-domain transformation is calculated using a Fourier-series formula.

6. A generator according to claim 3, wherein said first binary signal comprises a symmetric binary pulse sequence and wherein each said first transition in said first half sequence has a corresponding said second transition in said second half sequence occurring substantially one-half period of said ringing frequency after said corresponding first transition in order to form said symmetry in order to substantially cancel all even-frequency harmonics.

7. A generator according to claim 2, wherein said first binary signal comprises a symmetric binary pulse sequence and wherein each said first transition in said first half sequence has a corresponding said second transition in said second half sequence occurring substantially one-half period of said ringing frequency after said corresponding first transition in order to form said symmetry in order to substantially cancel all even-frequency harmonics.

8. A generator according to claim 1, wherein said timings of said first and second transitions are calculated using principles of frequency-domain/time-domain transformation to substantially cancel selected low-frequency harmonics.

9. A generator according to claim 8, wherein said frequency-domain/time-domain transformation is calculated using a Fourier-series formula.

10. A generator according to claim 1, wherein said first binary signal comprises a symmetric binary pulse sequence and wherein each said first transition in said first half sequence has a corresponding said second transition in said second half sequence occurring substantially one-half period of said ringing frequency after said corresponding first transition in order to form said symmetry in order to substantially cancel all even-frequency harmonics.

11. A method for generating a ringing signal, comprising the steps of:
(a) digitally generating a first signal which repeats at a desired ringing frequency, each period of said first signal comprising a binary pulse sequence having a plurality of degrees of freedom corresponding to timings of changes from one level of said first signal to another, said degrees of freedom chosen using principles of frequency-domain/time-domain transformation to substantially cancel selected harmonics so that the signal is substantially free from low frequency components, other than the ringing frequency, below a predetermined threshold;
(b) in response to said first signal, generating a second binary signal using a solid state current source, said second binary signal having frequency components substantially the same as said first signal; and
(c) filtering the high frequency components of said second binary signal occurring above a predetermined threshold frequency to produce the ringing signal.

12. A method according to claim 11 further comprising the step of digitally generating said first signal using digital logic which is programmed to produce said binary pulse sequence.

13. A method according to claim 12, wherein said digital logic causes each said first transition in said first half sequence to occur as a result of a predetermined count being reached in a digital counter driven by said digital frequency generator.

14. A method according to claim 13, wherein said first signal comprises a symmetric binary pulse sequence and wherein each first transition in a first half sequence has a corresponding second transition in a second half sequence occurring substantially one-half period of said ringing frequency after said corresponding first transition, in order to form said symmetry, and in order to substantially cancel all even-frequency harmonics.

15. A method according to claim 11, wherein said first signal comprises a symmetric binary pulse sequence and wherein each first transition in a first half sequence has a corresponding second transition in a second half sequence occurring substantially one-half period of said ringing frequency after said corresponding first transition, in order to form said symmetry, and in order to substantially cancel all even-frequency harmonics.

16. A method according to claim 11, wherein said frequency-domain/time-domain transformation is calculated using a Fourier-series formula.

17. A ringing generator, comprising:
binary signal source means for generating a binary signal which repeats at a desired low frequency ringing frequency, said binary signal comprising a binary pulse sequence having a plurality of degrees of freedom corresponding to timings of changes of the signal from one level to another, said source means providing control over said plurality of degrees of freedom so that certain low frequency components are suppressed or cancelled; and
means for generating a ringing signal in response to said binary signal including means for filtering certain high frequency components to produce the ringing signal for application to a telephone line.

18. A generator according to claim 17 wherein said binary signal source means includes a digital frequency generator including digital logic providing control over the degrees of freedom of the pulse sequence.

19. A method for generating a ringing signal, comprising the steps of:
(a) generating a binary signal which repeats at a desired ringing frequency, said binary signal comprising a binary pulse sequence having a plurality of degrees of freedom corresponding to the timings of changes of the signal from one level to another, said of degrees of freedom chosen to control said signal to suppress or cancel certain frequency components; and
(b) filtering certain frequency components from the binary signal to generate a ringing signal at the desired ringing frequency.

20. A method according to claim 19 further wherein the binary signal is generated using a digital signal generator providing control over the degrees of freedom of the waveform.

21. A method according to claim 19 further wherein in step (b) the binary signal is filtered to produce a substantially sinusoidal ringing signal.

22. Apparatus for generating a ringing signal, comprising:

(a) means for generating a binary signal which repeats at a desired ringing frequency, said binary signal comprising a binary pulse sequence having a waveform with a plurality of degrees of freedom corresponding to the timings of changes of the binary signal from one level to another, said of degrees of freedom used to control said binary signal to suppress or cancel certain frequency components; and (b) means for filtering certain frequency components from the binary signal to generate a ringing signal at the desired ringing frequency.

23. An apparatus according to claim 22 further wherein the binary signal is filtered to produce a substantially sinusoidal ringing signal.

* * * * *